United States Patent
Van Buren et al.

(10) Patent No.: US 7,409,186 B2
(45) Date of Patent: Aug. 5, 2008

(54) DETECTION AND ELIMINATION OF OSCILLATION WITHIN CELLULAR NETWORK AMPLIFIERS

(75) Inventors: V. Alan Van Buren, Cedar City, UT (US); Volodymyr Skrypnyk, Hurricane, UT (US); Patrick L. Cook, St. George, UT (US)

(73) Assignee: Wilson Electronics, Inc., St. George, UT (US)

( * ) Notice: Subject to any disclaimer, the term of this patent is extended or adjusted under 35 U.S.C. 154(b) by 161 days.

(21) Appl. No.: 11/457,406

(22) Filed: Jul. 13, 2006

(65) Prior Publication Data
US 2008/0014863 A1   Jan. 17, 2008

(51) Int. Cl.
H04B 7/14   (2006.01)
(52) U.S. Cl. .............................. 455/10; 455/15; 455/24
(58) Field of Classification Search ........................ None
See application file for complete search history.

(56) References Cited

U.S. PATENT DOCUMENTS

| | | | |
|---|---|---|---|
| 5,095,528 A * | 3/1992 | Leslie et al. | 455/10 |
| 5,815,795 A | 9/1998 | Iwai | |
| 6,892,080 B2 | 5/2005 | Friesen et al. | |
| 7,233,771 B2 | 6/2007 | Proctor, Jr. et al. | |
| 2005/0272367 A1 | 12/2005 | Rodgers et al. | |
| 2007/0071128 A1 | 3/2007 | Meir et al. | |

* cited by examiner

Primary Examiner—Thanh C Le
(74) Attorney, Agent, or Firm—Workman Nydegger

(57) ABSTRACT

A system and method for substantially reducing oscillation produced by a network amplifier. An exemplary method includes receiving a cellular signal at a first antenna of a network amplifier and applying a first amplification factor to the cellular signal. The resultant amplified cellular signal is transmitted to a target destination via a second antenna. A first signal level of the cellular signal is measured while the first amplification factor is being applied to the cellular signal. Then, a second amplification factor that is less than the first amplification factor is applied to the cellular signal, during which a second signal level of the cellular signal is measured. If the second signal level is significantly less than the first signal level, the first amplification factor is reduced by a predetermined amount.

10 Claims, 8 Drawing Sheets

DETECTION AND ELIMINATION OF OSCILLATION WITHIN CELLULAR NETWORK AMPLIFIERS

CROSS-REFERENCE TO RELATED APPLICATIONS

This application relates to the U.S. patent application Ser. No. 11/457,384, Filed Jul. 13, 2006, entitled "Processor-Controlled Variable Gain Cellular Network Amplifiers with Oscillation Detection Circuit" to Van Buren, et al, which is incorporated herein in its entirety by this reference.

BACKGROUND OF THE INVENTION

1. The Field of the Invention

The present invention relates to cellular network amplifiers. More particularly, embodiments of the present invention relate to systems and methods for dynamically controlling a network amplifier to provide an optimal gain level and to minimize amplifier oscillation.

2. The Relevant Technology

In recent years, cellular ("cell" or "mobile") telephones have dramatically increased in popularity. A growing number of people are relying exclusively on cell phones, and are abandoning their traditional land line telephone services in favor of the convenience of the mobility of cell phones. This increase in cell phone reliance has resulted in the need for reliable cellular signal coverage over a wider area.

Use of cell phones in areas having a weak signal often result in dropped calls which can be annoying for the cell phone user and expensive for the wireless service provider. Dropped calls typically result when the signal between the cell phone and the base station is lost. A loss of signal may occur for a number of reasons, including interference due to buildings or mountains, or an increase in distance between the cell phone and the base station. Therefore, a particular need exists to increase the reliability of cell phones near large buildings and in vehicles driving long distances in remote areas.

Attempts have been made to increase the reliability of cell phones through use of cell phone signal boosters, also known as cellular network amplifiers. Cellular network amplifiers receive the cellular signal sent from a base station, amplify the signal, and retransmit the signal to one or more cell phones. Similarly, the cellular network amplifier receives the signals from one or more cell phones, amplifies the signals, and retransmits the signals to the base station.

Cellular network amplifiers are typically placed in relatively close proximity to one or more cell phones, and serve the purpose of increasing the level of the signals being transmitted to and from the cell phones so that the cell phones can communicate with base stations that would otherwise be out of range. Some amplifiers are configured to be integrated with the cell phone itself or with a cell phone cradle. Alternatively, other amplifiers are configured to be placed in a separate location from the cell phone itself For example, a cellular network amplifier may be placed in a user's vehicle, or in or near a building that would otherwise have poor reception.

Conventional cell phone signal boosters apply constant gain levels to the signal passing through the amplifier. In general, signal boosters typically increase signal power to the maximum allowable power as permitted by the relevant governing agency. Producing this maximum regulatory allowable power can often be beneficial where the signal booster is located a long distance from the base station. However, if the signal booster is located within close proximity to a base station and the amplifier gain is too high, the signals transmitted from the signal booster may cause interference to be introduced in the surrounding cellular network by overloading the base station. Furthermore, over-amplification may also result in an unstable amplifier, causing unwanted oscillation. Both of these conditions will likely cause harmful interference to the base station and the cell phones connected to it.

The tendency for many cell phone signal boosters to cause interference creates a significant problem for wireless service providers by causing degradation to the overall quality of their service. Since wireless service providers often evaluate and approve cellular network amplifiers before they are used in the providers' systems, the providers are unlikely to approve signal boosters that cause interference.

BRIEF SUMMARY OF THE INVENTION

The present invention relates to systems and methods for substantially reducing the presence of oscillation in a cellular network amplifier. The cellular network amplifier amplifies cellular signals by a sufficient or variable amount to successfully retransmit the signals between a base station and a handset or cellular phone. However, the cellular network amplifier also ensures that the signals are not amplified to an extent that generates an oscillating condition, which may introduce detrimental interference into a surrounding cellular network. In particular, the network amplifier prevents the network amplifier itself from creating an oscillation that interferes with the communication needs of the cellular or wireless network.

In one embodiment, the cellular network amplifier is configured with antennas used in the transmission of cellular signals between a base station and one or more handsets. The cellular signals received from the base station and the handsets are amplified by variable gain modules. The amount of amplification is determined by an amplification factor. The value of the amplification factor is controlled by a control circuit, such as a microprocessor, based on a number of factors. For example, the control circuit analyzes the cellular signals to detect the presence of an oscillation in the network amplifier. Where an oscillation is detected, the control circuit adjusts the amplification factors in a manner that stops the oscillating condition. After the cellular signals are amplified by the variable gain modules, the amplified signals are retransmitted via the antennas to the base station and the handsets, respectively.

In one alternative embodiment, the amplification factor is determined by measuring the signal level of the cellular signal received from the handset and/or from the base station. If one or both of the cellular signals exceed a predetermined signal value, the amplification factor is reduced by a predefined amount.

In another embodiment, the amplification factor is simply shut off (i.e., set to a zero value) when oscillation condition is detected. Alternatively, the value of the amplification factor may be incrementally reduced until the oscillation is eliminated. One embodiment of the invention combines both of the above aspects, and automatically shuts off the amplification when a severe oscillation is detected, but may alternatively incrementally reduce the amplification until the oscillation is stopped.

Another embodiment is directed to a method of substantially reducing oscillation. The method may be practiced, for example, in a cellular network amplifier. The method includes receiving a cellular signal at a first antenna of a network amplifier and applying a first amplification factor to the cellular signal. The resultant amplified cellular signal is transmitted to a target destination via a second antenna. A first signal level of the cellular signal is measured while the first amplification factor is being applied to the cellular signal. Then, a second amplification factor that is less than the first amplification factor is applied to the cellular signal. While the second amplification factor is being applied to the cellular signal, a second signal level of the cellular signal is measured. If the second signal level is significantly less than the first signal level, the first amplification factor is reduced by a predetermined amount. The method may be repeated until the second signal level is not significantly less than the first signal level.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
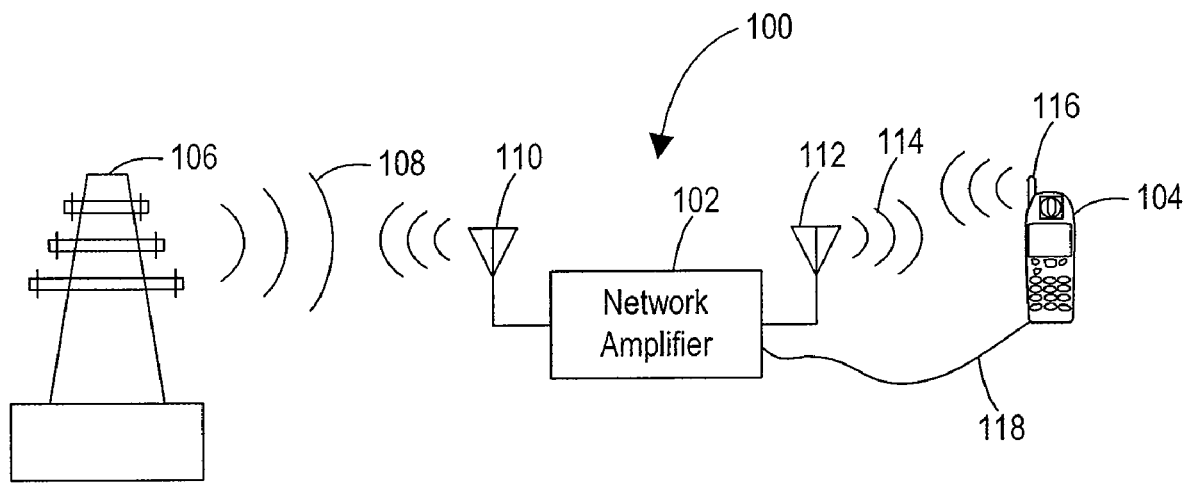
FIG. 1 illustrates a block diagram of a cellular communications system.

Embodiments of the invention relate to amplifiers that enhance the ability of a device such as a cellular telephone to communicate in a wireless network. The present invention extends to a cellular network amplifier that dynamically adjusts the gain applied to a cellular signal. One embodiment of the network amplifier variably adjusts its gain as needed. The ability to automatically adjust the gain applied to a cellular signal can prevent the amplifier from generating signals that may interfere with the operation of a cellular network or with the operation of the network amplifier itself Too much gain, for example, can cause the network amplifier to oscillate, which results in interference to the cellular network and adversely impacts users of the cellular network. Also, too much gain increases the amount of residual noise at the base station.

Embodiments of the network amplifier can be integrated with cellular telephones (or other devices) or connect with a cellular telephone. The amplifier acts as an intermediary between a base station (or other cell site) and a handset (a cellular telephone or other device). Signals generated by the cellular telephone are amplified and retransmitted by the network amplifier. The network amplifier also receives signals from the base station and transmits them to the cellular telephone.

The cellular network amplifier receives a first cellular signal from a base station via a first antenna and a second cellular signal from a handset via a second antenna. A control circuit analyzes the cellular signals to determine the presence of oscillation, and adjusts an amplification factor in a manner that eliminates the oscillating condition. The adjusted amplification factor is applied to the first and/or second cellular signals, and the resulting cellular signals are retransmitted via the first and second antennas to the base station and the handset, respectively.

For purposes of the present invention, the following definitions are provided. The terms "cellular" and "cellular network" refer to a wireless telephone network that connects radio transmissions between a mobile phone and a system of multiple cell sites, each including an antenna and a base station, to a mobile telephone switching office, and ultimately to the public wire line telephone system. Cellular calls are transferred from base station to base station as a user travels from cell to cell. One of skill in the art can appreciate that embodiments of the invention can be applied to other wireless networks including those operating on various frequencies throughout the electromagnetic spectrum.

By way of example, the phrase "cell phone" refers to a wireless device that sends and receives messages using radiofrequency signals in the 800-900 megahertz (MHz) portion of the radiofrequency (RF) spectrum, and the phrase "PCS phone" (personal communication system phone) refers to a wireless device that uses radiofrequency signals in the 1850-1990 MHz portion of the RF spectrum. For purposes of simplicity, as used herein, the terms "cell phone" and "handset" are intended to cover both "cell phone" and "PCS phone", as defined above, as well as other handheld devices. Likewise, as used herein, the phrase "cellular signal" refers to signals being transmitted both in the cell phone spectrum (i.e., 800-900 MHz) and in the PCS spectrum (i.e., 1850-1990 MHz). One of skill in the art can appreciate that embodiments of the invention are not limited to operation in these frequency spectrums, but can be applied in other portions of the frequency spectrum as well. In addition, other wireless devices such as personal digital assistants, laptop computers, and the like can benefit from embodiments of the invention.

"Cell site" and "base station" are used herein interchangeably. Cell site and base station are defined as the location where the wireless network antenna and communications equipment is placed. A cell site or base station typically includes a transmitter/receiver, antenna tower, transmission radios and radio controllers for maintaining communications with mobile handsets within a given range.

The phrase "uplink signal" refers to the transmission path of a signal being transmitted from a handset to a base station. The phrase "downlink signal" refers to the transmission path of a signal being transmitted from the base station to the handset. The phrases "uplink signal" and "downlink" signal are not limited to any particular type of data that may be transmitted between a handset and a base station, but instead are simply used to specify the direction in which a signal is being transmitted.

FIG. 1 shows an exemplary communications system 100. The communications system 100 may be a cellular telephone wireless network or other wireless network. In this example, a network amplifier 102 amplifies the signals transmitted between a base station 106 and a handset 104. In a typical system, the network amplifier 102 is located in close proximity to the handset 104 in comparison to the distance to the base station 106. The base station 106 transmits a signal 108 into the surrounding air, which is attenuated for various reasons known to one of skill in the art as it travels outward from the base station 106. An antenna 110 receives the signal 108 and converts the radiated signal into a conducted electrical equivalent.

The network amplifier 102 amplifies the electrical signal and communicates the amplified signal to the handset 104. In one example, the network amplifier 102 may retransmit the electrical signal from a second antenna 112 as an amplified RF signal 114. The amplified signal 114 is received by an antenna 116 of handset 104, which processes the signal and ultimately communicates the appropriate content to a user of handset 104. As previously indicated, the network amplifier 102 may be an integral part of the handset 104.

Similarly, the handset 104 may communicate content to the network amplifier 102 by transmitting an RF signal from the antenna 116, which is ultimately received by the antenna 112. The network amplifier 102 amplifies the received signal and retransmits the signal using the antenna 110. The transmitted signal is received by the base station 106, which may perform a number of operations on the signal, as determined by the wireless service provider.

Figure 2:
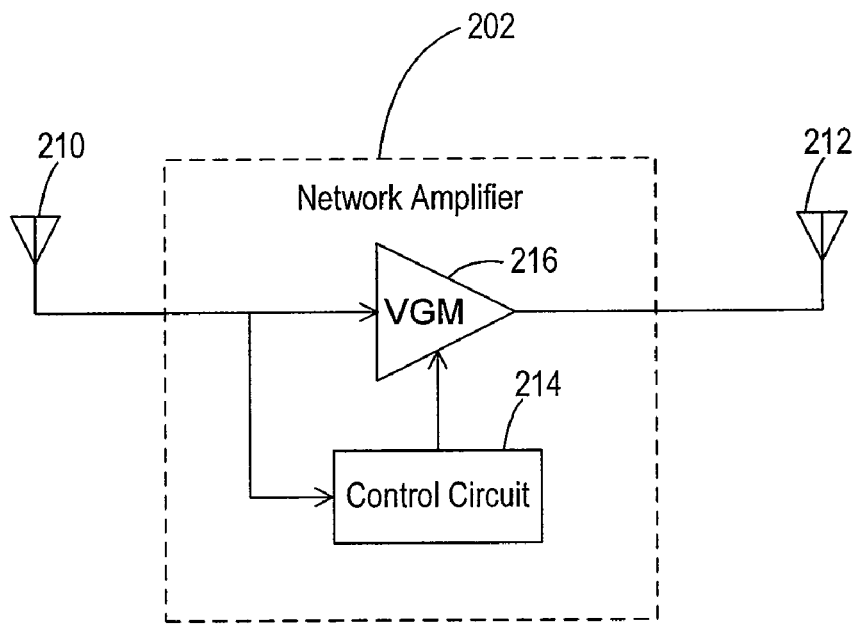
FIG. 2 illustrates one embodiment of a unidirectional amplifier.

FIG. 2 illustrates a generalized unidirectional amplifier 202 configured for producing an optimal gain level, in accordance with the present invention. The amplifier 202 is connected to an antenna 210 which is configured to receive a signal. The antenna 210 converts the received signal into an electrical signal. The electrical signal is received by a variable gain module (VGM) 216, which applies an amplification factor to the electrical signal. In one embodiment, the electrical signal is communicated via a second antenna 212, which transmits the adjusted electrical signal as an RF signal, to be received by one or more handsets or other devices.

The variable gain module 216 is controlled by a control circuit 214. The control circuit 214 receives the electrical signal from the antenna 210, and based on the properties of the electrical signal, determines an optimal amplification factor that should be applied to the electrical signal. The control circuit 214 provides a control signal to the variable gain module 216. The control signal instructs the gain module 216 as to the amplification factor that should be applied to the electrical signal. Many factors may be accounted for when calculating the required amplification factor. Factors include, by way of example and not limitation, the level or strength of the electrical signal and whether there is any indication that the network amplifier 202 is oscillating or overloading the cellular network in any way.

The amplification factor, in one embodiment, is a multiplier that is applied to the electrical signal. The amplification factor can result in either an amplified or attenuated output signal. In other words, where the amplification factor is less than one, the amplified adjusted signal will have lower amplitude than the original electrical signal. Conversely, when the amplification factor is greater than one, the amplified adjusted signal will have greater amplitude than the original electrical signal.

Figure 3A:
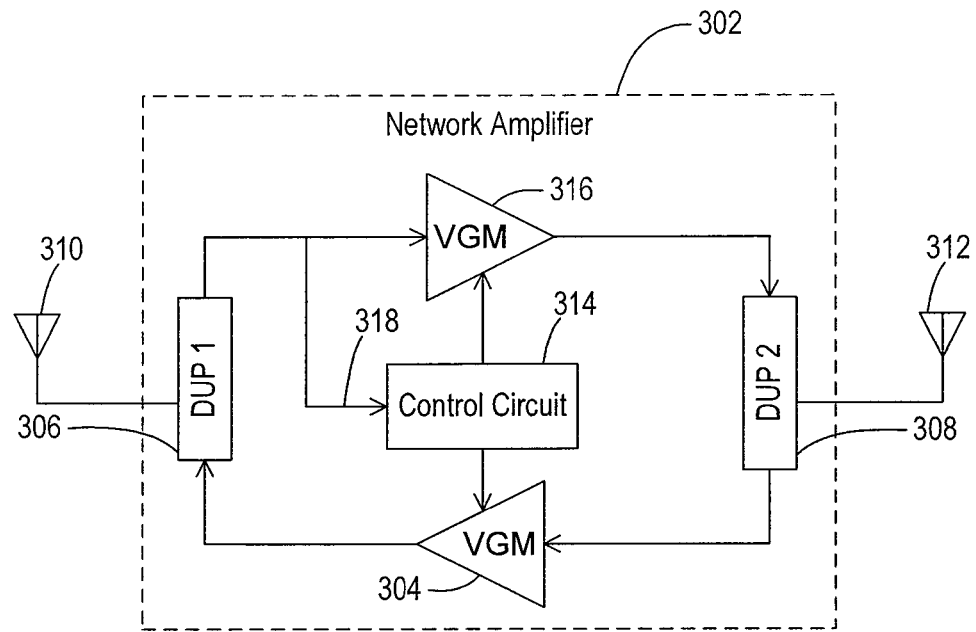
FIGS. 3A, 3B, 4A, and 4B are exemplary schematics of bidirectional cellular network amplifiers.

FIG. 3A illustrates one embodiment of a bidirectional network amplifier 302 configured to control the amplification of cellular signals being transmitted between a base station and a handset. Similar to network amplifier 202 illustrated in FIG. 2, a cellular signal is received from a base station at the antenna 310 and is passed to both a control circuit 314 and a variable gain module 316. Control circuit 314 controls the amplification factor of variable gain module 316. The amplified signal may be connected to a second antenna 312, which transmits a cellular signal to at least one handset.

Bidirectional cellular amplifier 302 is also configured to receive signals from one or more handsets, amplify those signals, and retransmits the signals to a base station. A signal from a handset may be received by antenna 312. The signal is routed to a second variable gain module 304, which applies an amplification factor to the signal. The amplification factor is determined and controlled by control circuitry 314.

In order to allow antennas 310 and 312 to simultaneously transmit and receive signals, duplexers (DUP) 306 and 308 are provided by way of example. A duplexer is defined as an automatic electrical routing device that permits simultaneous transmitting and receiving through a common point. More generally, a duplexer is a three port device with one common port "A" and two independent ports "B" and "C". Ideally, signals are passed from A to B and from C to A, but not between B and C. For example, the duplexer 306 receives an RF signal from a base station and converts the signal into a first electrical signal, which is routed to the inputs of the variable gain device 316 and the control circuitry 314. The duplexer 306 simultaneously receives a second electrical signal from the output of the variable gain module 304, and causes this signal to be transmitted as an RF signal via the antenna 310.

The control circuitry 314 may be configured to accomplish various objectives when determining the amplification factors to be applied to the variable gain modules 304 and 316. Exemplary objectives include, but are not limited to, i) setting the power level at which the signals are transmitted at a sufficient level to ensure that the signals reach a target destination; and ii) ensuring that the signals transmitted from the network amplifier are transmitted at a power level that substantially eliminates the interference that would otherwise be introduced into the surrounding cellular network.

First, the control circuitry 314 establishes the amplification factors of the variable gain modules 304 and 316 so that the resultant signals are transmitted with sufficient power to adequately reach a target destination, such as a handset or a base station. Where the cellular signal received at the antenna 310 has undergone significant attenuation, e.g., when the target destination is located a long distance away from the network amplifier 302, the amplification factor is increased. Conversely, where the cellular signal received at the antenna 310 is at a sufficiently high level, a lower amplification may be established for variable gain modules 316 and 304.

Second, the control circuitry 314 ensures that the signals transmitted from the network amplifier are transmitted at a power level that substantially eliminates the interference that would otherwise be introduced into the surrounding cellular network. Many cellular networks, such as CDMA systems, are configured such that the power level transmitted by each handset in the network is determined by the base station. When communication between a handset and a base station is initiated, a "handshake" occurs between the handset and base station, and the base station instructs the handset as to the power at which the handset should transmit. If the base station determines that the signal from the handset is too strong, it will instruct the handset to reduce the power level of the transmitted signal. The CDMA system is designed so that all of the signals coming into the base station are of approximately the same power. If one signal arrives at the base station at a power level that is significantly higher than the others, it can potentially overpower the base station and cause interference with the other handsets in communication with the base station.

Therefore, the control circuitry 314 may determine the maximum amplitude or power level that can be transmitted by antenna 310 to substantially eliminate interference. Interference is considered to be substantially eliminated when signals are transmitted from the network amplifier 302 without causing harmful effects to the surrounding cellular network. For example, interference is substantially eliminated where the signals are transmitted without overpowering the base station, or otherwise interfering with other handsets within the cellular network in a way that degrades their performance. The control circuitry 314 may establish the amplification factors applied to variable gain modules to either attenuate or amplify the electrical signals in order to achieve this objective.

The determination of the amplification factor values may be dependent on whether the signals received from the base station via antenna 310 exceed a threshold value. The threshold value may be a predetermined set value, or may be a variable that is not established until the control circuitry 314 makes a determination. For example, if after analyzing the strength of the signals received via antenna 3 10, the control circuitry 314 determines that the signal attenuation between cellular network amplifier 302 and the target base station or handset is substantial, the control circuitry 314 may establish higher threshold values than if the base station signal was less attenuated. The higher threshold values would allow a greater amplification factor to be applied to the signals so that the transmitted signals will reach their target destination. Because of the substantial distance over which the signals must traverse, the signals will arrive at the target destination (e.g., a base station) without exceeding an appropriate power level, and will therefore not overpower the base station or cause substantial interference with signals transmitted from other handsets.

In the embodiment of FIG. 3A, the amplification factors applied to the variable gain modules 316 and 304 are both determined based on the attributes of the signal received from a base station via the antenna 310. The input signal from the base station is received by the control circuitry 314 from the antenna 310 at the connection 318, and radiated to a handset via antenna 312. The control circuitry 314 can make a number of determinations based on the attributes of the base station signal. First, the control circuitry 314 can determine the amplitude level of the signal from the base station. Based on the amplitude, the control circuitry can determine an adequate amplification factor for the variable gain module 316 to enable communication of the received signal to a handset. Second, the amplitude of the signal received from the base station is also an indicator of the amplitude required to successfully transmit a signal back to the base station via the antenna 310. For example, if the control circuitry 314 measures low amplitude of the first electrical signal, it is likely that the signal transmitted by the base station has been substantially attenuated between the base station and the network amplifier 302. Therefore, it can determine the amplification factor required by the variable gain module 304 so that the second electrical signal originating from the handset is retransmitted with sufficient power to reach the base station.

Figure 3B:
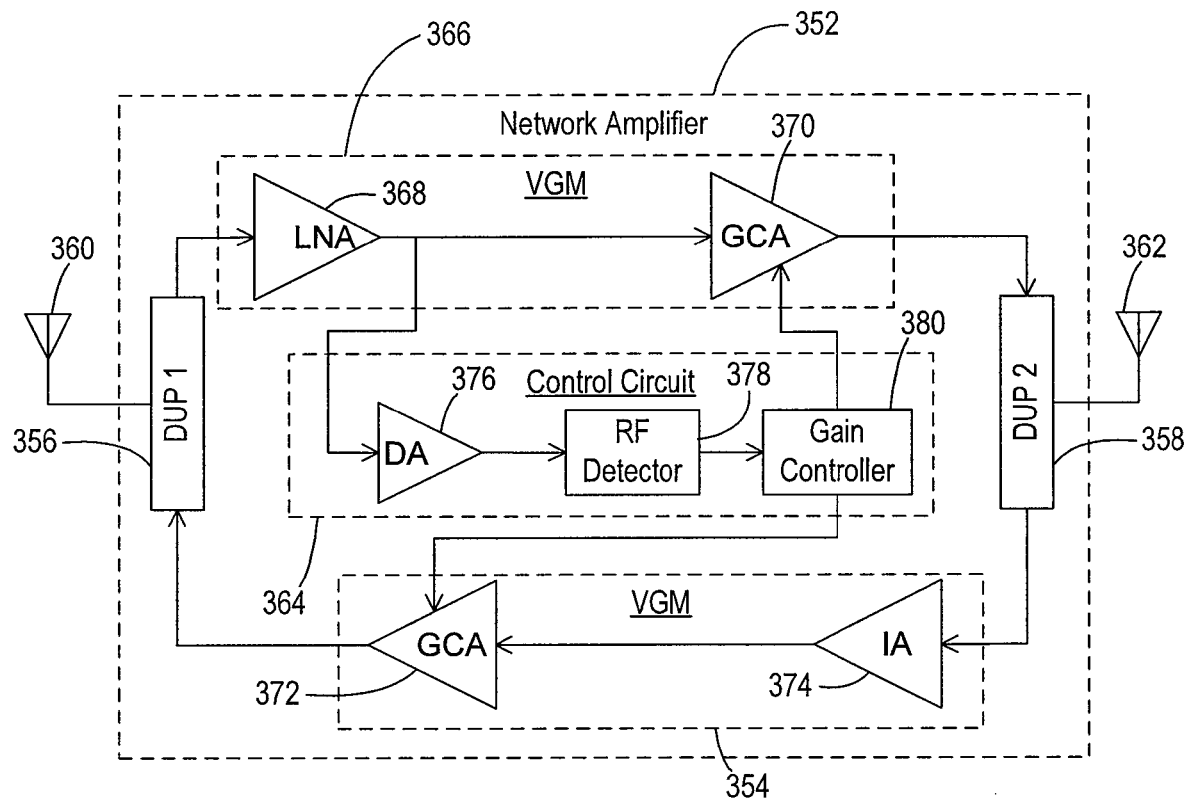

FIG. 3B illustrates another embodiment of a network amplifier. Similar to the network amplifier illustrated in FIG. 3A, the network amplifier 352 includes an antenna 360, a first and second duplexer (DUP 1) 356 and (DUP 2) 358, respectively, a first and second variable gain module 354 and 366, (included within the dashed boxes), control circuitry 364 (indicated by the dashed box), and an antenna 362. More particularly, the variable gain module 366 includes a low noise amplifier (LNA) 368 and a gain controlled amplifier (GCA) 370. The gain module 354 contains an intermediate amplifier (IA) 374 and a gain controlled amplifier (GCA) 372. The gain controlled amplifiers 370 and 372 may include voltage controlled amplifiers, digitally controlled programmable gain amplifiers, and the like. The input of the control circuitry 364 is received from the output of the low noise amplifier 368 for providing an adequate signal to be used for determining the amplification factors.

The control circuitry 364 includes, in this example, a detector amplifier (DA) 376, an RF detector 378, and a gain controller 380. Detector amplifier 376 amplifies the input signal to a level sufficient for driving RF detector 378. The RF detector 378 produces an output which is indicative of the signal level produced by the output of the low noise amplifier 368. As described above, the control circuitry 364 may be configured to accomplish various objectives when determining the amplification factors to be applied to the variable gain modules 366 and 354.

For example, based on the output of the RF detector 378, the gain controller 380 may increase the amplification factors applied to gain controlled amplifier 370 or 372 to ensure that the resultant signals have sufficient power and amplitude to provide satisfactory results. Where the input signal received by the network amplifier 352 by means of antenna 360 is sufficiently weak, the gain controller 380 typically sets the amplification factors to a maximum available value.

Furthermore, the gain controller 380 may decrease the amplification factors where it is determined that the signal levels would otherwise overload the base station, or otherwise cause harmful interference to the cellular network. In one embodiment, when the output of the RF detector 378 exceeds a predetermined threshold, the gain controller 380 turns off the gain controlled amplifiers 372 and 370. In other words, the control circuit 364 switches the amplification factor to a zero value when the level of the cellular signal received from the base station exceeds a predetermined value, and switches the amplification factor to a non-zero value when the signal level falls below the predetermined value.

In another embodiment, the gain controller 380 does not simply switch the gain controlled amplifiers on or off, but instead adjusts the amplification relative to the level of the signal received from the base station. In other words, the control circuit 364 sets the value of the amplification factors as a function of the level of the cellular signal received from the base station.

In one embodiment, the amplification factors applied to the gain controlled amplifiers 370 and 372 are equivalent. However, in another embodiment, the amplification factors applied to the gain controlled amplifiers 370 and 372 need not be the same. Although the gain controller 380 may only receive a single input signal, the gain controller may be configured to have two independent output signals to account for the unique requirements of the gain controlled amplifiers 370 and 372. In another embodiment, the changes made to the first and second amplification factors occur in identical incremental amounts. Therefore, even where the values of the amplification factors may not be identical, the changes made to the first amplification factor may match the changes made to the second amplification factor.

Figure 4A:
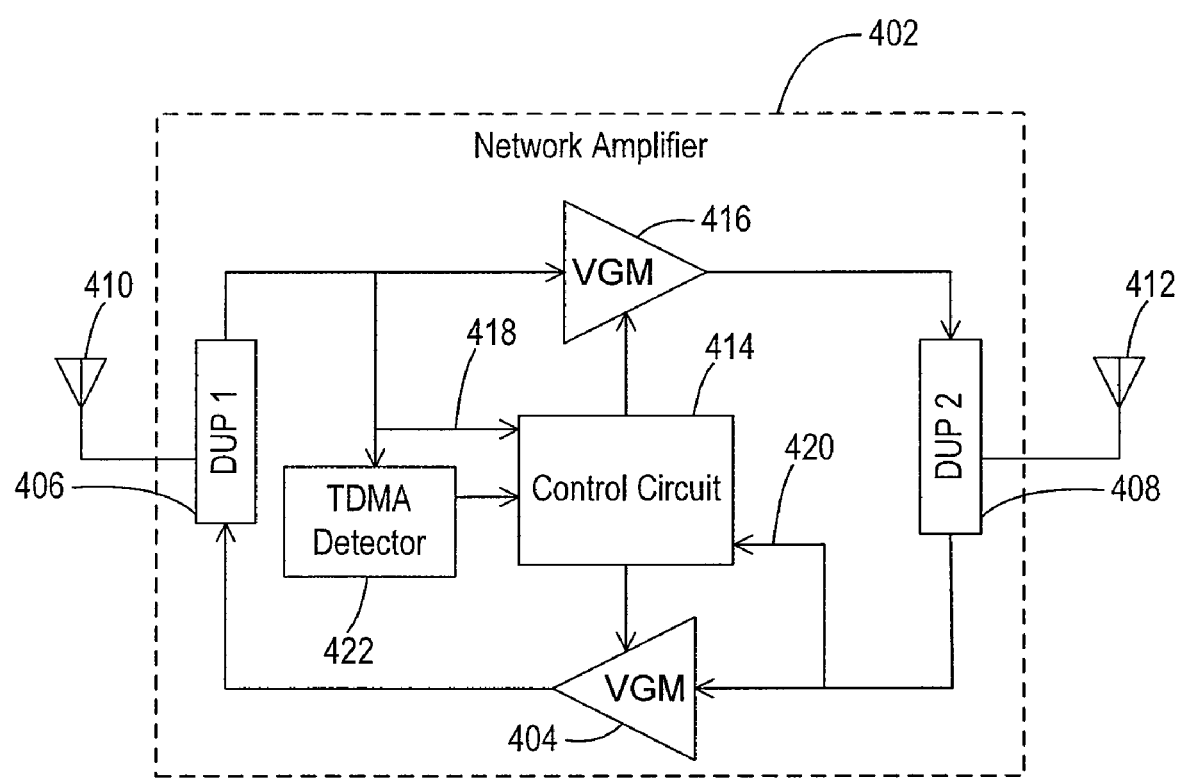

FIG. 4A illustrates another embodiment of a network amplifier 402 configured to generate optimum gain levels for the transmission of signals including radio or cellular type signals. The embodiment illustrated in FIG. 4A includes first and second antennas 410 and 412, respectively, first and second duplexers (DUP 1) 406 and (DUP 2) 408, respectively, first and second variable gain modules (VGM) 404 and 416, respectively, and control circuitry 414. The antenna 412 is configured for transmitting downlink signals to at least one handset, and for receiving uplink signals from the same. The antenna 410 is configured for transmitting uplink signals to a base station, and for receiving downlink signals from the same. The control circuitry 414 may include analog circuits, digital circuits either with or without a microprocessor, or a combination of both.

The control circuitry 414 controls the amplification factors applied to the variable gain modules 404 and 416. Similar to the control circuitry 314 of the embodiment illustrated in FIG. 3A, the control circuitry 414 may be configured to ensure that sufficient gain is applied to the cellular signals to ensure that the signals reach their target destination, and further ensure that the power level at which the signals are sent does not overload the base station.

The network amplifier 402 communicates with handsets via antenna 412, and is not directly connected to the handsets via a connector. The amplification factor applied to variable gain module 404 is calculated using the characteristics of the signals received from the handsets, as well as from the base station. In this example, the control circuitry 414 receives input signals from the antenna 410 and the antenna 412 (i.e., connections 418 and 420, respectively). By monitoring the characteristics of the signals received from the handset and from the signals received from the base station, the control circuitry 414 can make more accurate determinations regarding the level at which signals should be transmitted to the base station and to the handsets.

In addition to accomplishing the above objectives, the control circuitry 414 may further be configured to substantially eliminate oscillation that may be generated by the network amplifier 402. When multiple antennas (e.g., antennas 410 and 412) are employed, embodiments of the invention ensure that the network amplifier 402 does not begin to oscillate. If the antennas 410 and 412 are too close to each other, an oscillation may result, which will likely cause harmful interference to a base station and/or the handsets connected to it and preclude effective communications. Oscillation in the network amplifier 402 is typically caused by feedback that may occur between the two antennas 410 and 412. If the gains produced by variable gain modules 404 and 416 are sufficiently low, the network amplifier 402 will remain stable. However, when the gains are high with the antennas physically too close to each other, the system will likely become unstable, and begin to oscillate.

The introduction of oscillation by an amplifier into a cellular network can be a serious problem. Network amplifiers are often installed by an end user instead of by a wireless service provider. Consequently, the wireless service provider cannot easily predict or mitigate the interference introduced by oscillation. The oscillating signals produced by the network amplifier 402 can extend beyond the intended target (i.e., the base station or handset) and intermingle with other signals. As a result, an oscillating signal from one cellular network amplifier can disrupt the communication links between a base station and the handsets within range of the oscillating amplifier. Since such oscillating signals are not on controlled frequencies, they may even interfere with other users of the electromagnetic spectrum.

For example, a common use for the network amplifier 402 is to amplify cellular signals being transmitted to and from a building. In an in-building scenario, the network amplifier 402 may be configured such that the antenna 412 is located within the interior of the building, and the antenna 410 is located on the exterior of the building. Cellular signals transmitted from a base station are received at the external antenna 410, amplified by variable gain module 404 in accordance with the amplification established by control circuitry 414, and retransmitted by the internal antenna 412. Because the signals received from the base station are on the same frequency as the signals transmitted by the antenna 412, a potential for feedback exists, thus increasing the likelihood of an oscillating circuit. This likelihood is particularly high where the antennas 410 and 412 are located within close proximity to one another, and where the amplification of the variable gain modules 404 and 416 are set at a high level.

Therefore, the control circuitry 414 may be configured to prevent the occurrence of oscillation within the network amplifier 402. The control circuitry 414 achieves this objective by analyzing the signal levels of the inputs 418 and 420. When an oscillating condition exists, the levels of the signals received via the antennas 410 and 412 are typically significantly higher than when the network amplifier 402 is operating at normal conditions.

When the control circuitry 414 detects conditions that may indicate oscillation, the control circuitry 414 will eliminate the oscillating condition. The control circuitry 414 may turn off the entire network amplifier 402 so that the handsets communicate directly to the base station instead of through the amplifier 402. Alternatively, the control circuitry 414 may first attempt to only turn off the variable gain modules 404 and 416.

In an alternative embodiment, the control circuitry 414 may decrement the amplification of the variable gain modules 404 or 416 until the oscillation ceases. By decrementing the amplification factors instead of immediately shutting off the network amplifier, the oscillation can be eliminated while still maintaining some level of gain. This process can be applied to the variable gain modules 404 and 416, simultaneously together, one at a time, or in any other manner.

The network amplifier 402 may include a visual display for indicating the existence of an oscillating condition. For example, the visual display may include a light emitting diode (LED), or the like. The display may indicate that an oscillation has occurred in the past (but has since been eliminated by either shutting down the amplifier 402 or by reducing the gain of the variable gain modules 404 and/or 416) and may indicate the presence of an existing oscillation. After a user is aware of an oscillating condition, the user may reposition the antennas 410 and/or 412 so that the amplifier 402 may produce a larger gain without the introduction of oscillation.

The network amplifier 402 may also include a Time Division Multiple Access (TDMA) detector 422 for detecting if a signal is a TDMA signal, and for adjusting the operation of the control circuit 414 when a TDMA signal is detected. Because TDMA signals utilize a non-continuous transmission pattern (i.e., each TDMA telephone transmits in rapid succession, one after another), a TDMA signal that is sufficiently strong may cause the control circuit 414 to erroneously detect the presence of an oscillating signal. Therefore, the control circuit 414 may treat the TDMA signal as an oscillating signal by attenuating or eliminating the TDMA signal. To avoid this result, the TDMA detector 422 is provided to detect the presence of a TDMA signal, and to notify the control circuit 414 when a TDMA signal is detected. When the control circuit 414 is notified of the presence of a TDMA signal, the control circuit may alter its functionality so that the TDMA signal is not treated as an oscillating signal.

For example, upon being notified of the presence of a TDMA signal, the control circuit 414 may stop analyzing the signals received from the base station and from the handset to determine the presence of an oscillating signal. However, the control circuit 414 may continue to analyze the TDMA signals to determine the value of the amplification factors to be applied to the uplink and downlink signals to ensure that they are transmitted at sufficient power sufficient to reach their target destinations.

Although the TDMA detector 422 is illustrated as receiving the downlink signal from the base station, the TDMA detector may be configured to receive the uplink signal from a handset, the downlink signal from the base station, or both signals. Furthermore, the TDMA detector 422 may be integrated with the control circuit 414.

Figure 4B:
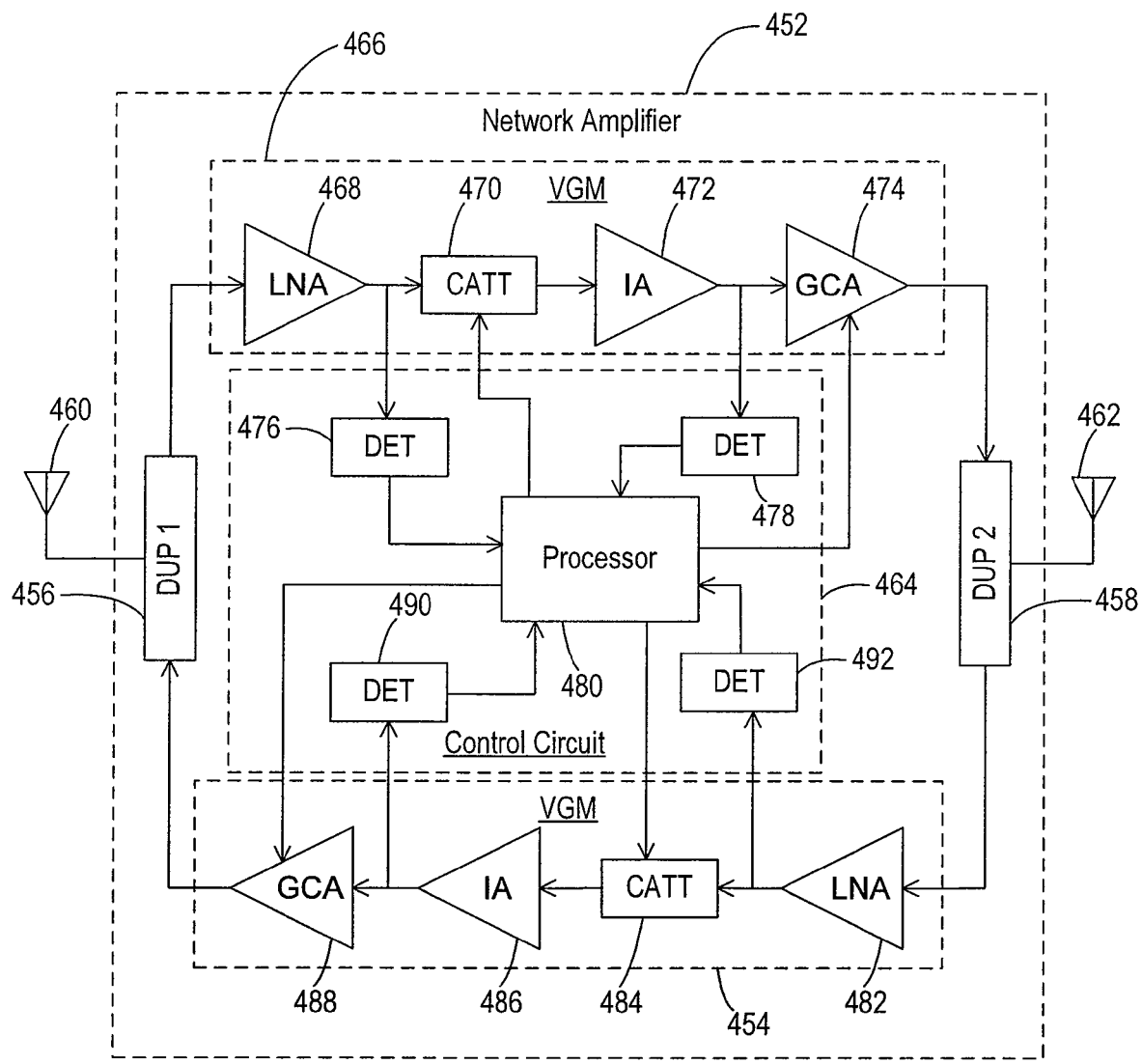

FIG. 4B illustrates another embodiment of a network amplifier. Similar to FIG. 4A, the network amplifier 452 includes first and second antennas 460 and 462, respectively, first and second duplexers 456 and 458, respectively, first and second variable gain modules, indicated by dashed boxes 466 and 454, respectively, and control circuitry, indicated by dashed box 464.

The first and second variable gain modules 454 and 466 may include low noise amplifiers (LNA) 468 and 482, controllable attenuators (CATT) 470 and 484, intermediate amplifiers (IA) 472 and 486, and gain controlled amplifiers (GCA) 474 and 488. The electrical signals generated by antennas 460 and 462 are initially amplified by the low noise amplifiers 468 and 482. The resultant signals may be attenuated by controllable attenuators 470 and 484. The amount of attenuation is dependant on first and second attenuation factors, as determined by the control circuitry 464. The resultant signal is amplified and buffered by intermediate amplifiers 472 and 486. The use of intermediate amplifiers 472 and 486 may vary depending on the gain levels required of the cellular network amplifier 452. The resultant signal is amplified by the gain controlled amplifiers 474 and 488 by an amount dependant on gain factors as determined by the control circuitry 464.

The control circuitry 464 includes, in this example, at least two detectors 478 and 490 that detect the signals at the output of the intermediate amplifiers 472 and 486. The results are provided to processor 480, which determines amplification factors for the variable gain modules 466 and 454. Each amplification factor includes a gain factor for the gain controlled amplifier 474 or 488, and an attenuation factor for the controllable attenuator 470 or 484. The processor 480 may increase or decrease the gain applied to the electrical signals while attempting to ensure that the transmitted signals reach their target destination (i.e., a handset or a base station). In the present embodiment, gain is increased by increasing the gain factor applied to the gain controlled amplifier 474 or 488. The processor 480 thus controls the gain applied to the gain controlled amplifier 474 or 488.

The processor 480 may further be configured to reduce or substantially eliminate interference that may be caused, by way of example, from overloading the base station. As described above, when the network amplifier 452 emits signals at excessive power levels, the base station may be overloaded, causing interference with the overall cellular network. Therefore, the processor 480 monitors the signal levels as provided by detector 478 or 490 to determine whether the signal levels exceed a threshold value. When the threshold is exceeded, the processor 480 may reduce the overall gain by either increasing the attenuation factor applied to the controllable attenuator 470 or 484, or by decreasing the gain factor applied to the gain controlled amplifier 474 or 488.

The processor 480 may similarly be configured to reduce or eliminate interference that may be caused from oscillation. When the detector 478 or 490 provides readings that indicate an oscillating condition, the processor 480 may incrementally change the attenuation factors applied to the controllable attenuators 470 and 484 and/or the gain factors applied to the gain controlled amplifier 474 or 488 in order to reduce the overall gain produced by the variable gain module 466 or 454. The attenuation factor may be incrementally increased, and the gain factor may be incrementally decreased. After each incremental change in the attenuation and/or gain factors, processor 480 analyzes the signal levels to determine if the oscillating condition still exists. If the amplifier 452 is still oscillating, the processor 480 increments the gain and/or attenuation factors again, and repeats the process until the oscillation has been eliminated, or at least reduced to an acceptable level.

In one embodiment of the present invention, additional detectors 476 and 492 are provided for the purpose of quickly eliminating any oscillation that may be generated by the network amplifier 452. While detectors 478 and 490 can be used to eliminate or reduce any oscillation by incrementally changing the gain and attenuation factors, as described in the previous embodiment, this mechanism may be too slow to preclude interference. Unfortunately, significant disruption can be caused to a cellular network within a much shorter period of time when an amplifier is oscillating. Therefore, detectors 476 and 492 are employed to provide a safety mechanism that can immediately eliminate oscillation when the oscillation exceeds a predetermined level. The detectors 476 and 492 provide the processor 480 with a reading of the signal level at the output of the low noise amplifier 468 or 482. If this reading exceeds a predetermined level, the processor 480 immediately shuts down all elements of the network amplifier 452 that are causing the oscillation to occur. The user is notified of the oscillation condition, and the user may reposition the antennas 460 and 462 in an attempt to eliminate the condition creating the oscillation. In this manner, disruption due to high levels of oscillation is prevented.

Although not shown, the network amplifier 452 may further include a TDMA detector, described above in reference to FIG. 4A. The TDMA detector may include an independent circuit, as illustrated in FIG. 4A, or may be integrated with the processor 480. The TDMA detector notifies the processor 480 of the presence of a TDMA signal and the processor 480 can then alter its functionality so that the TDMA signal is not treated as an oscillating signal. For example, upon being notified of the presence of a TDMA signal, the processor 480 may stop analyzing the signals received from the detectors 476, 478, 490 and 492 to determine the presence of an oscillating signal. However, the processor 480 may continue to analyze the TDMA signals to determine the values of the amplification factors to be applied to the uplink and downlink signals to ensure that they are transmitted at sufficient power to reach their target destinations.

Figure 5A:
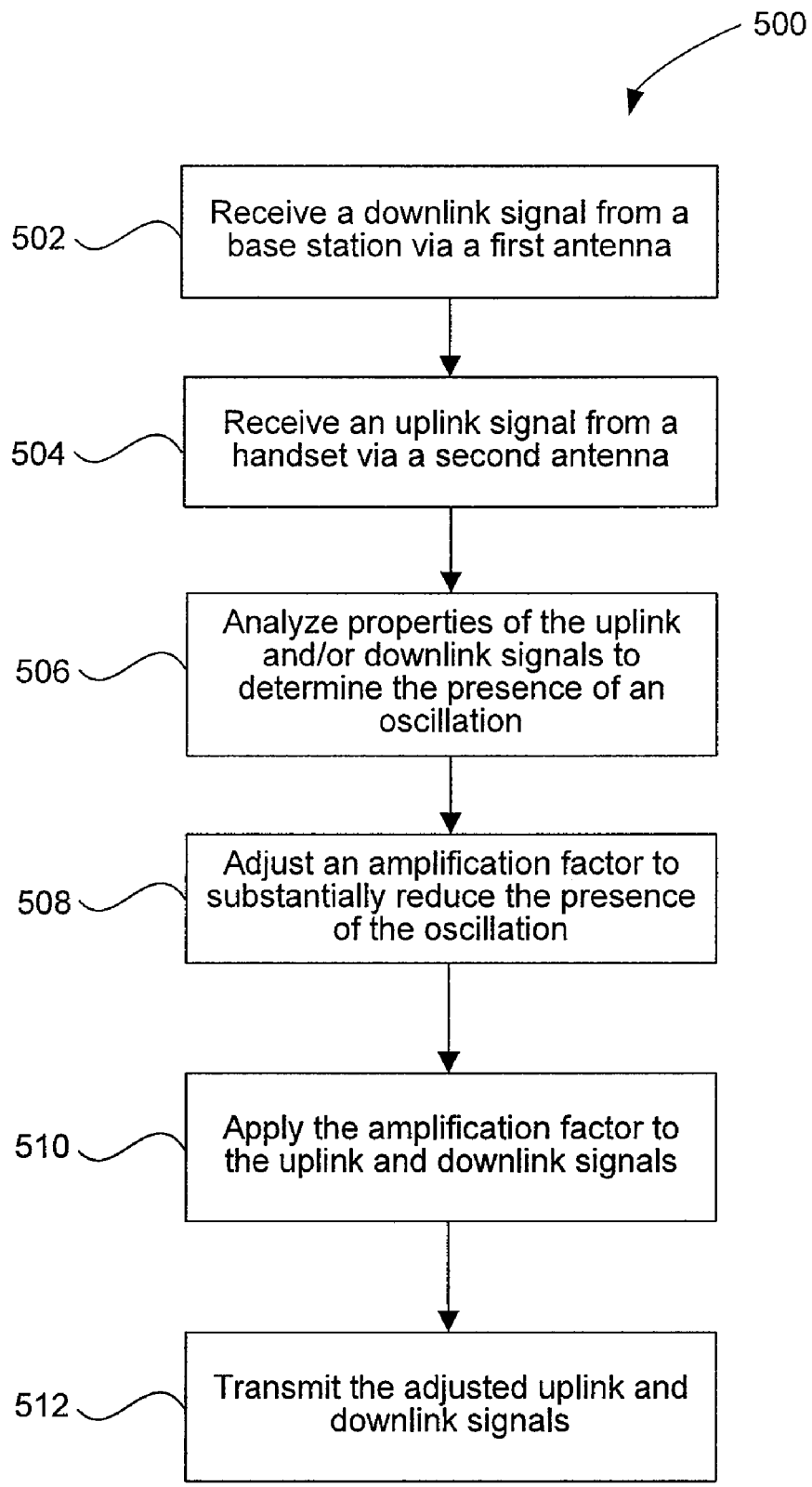
FIGS. 5A, 5B, 6A, and 6B are flow diagrams of exemplary methods for substantially reducing the presence of oscillation in a network amplifier.
Figure 5B:
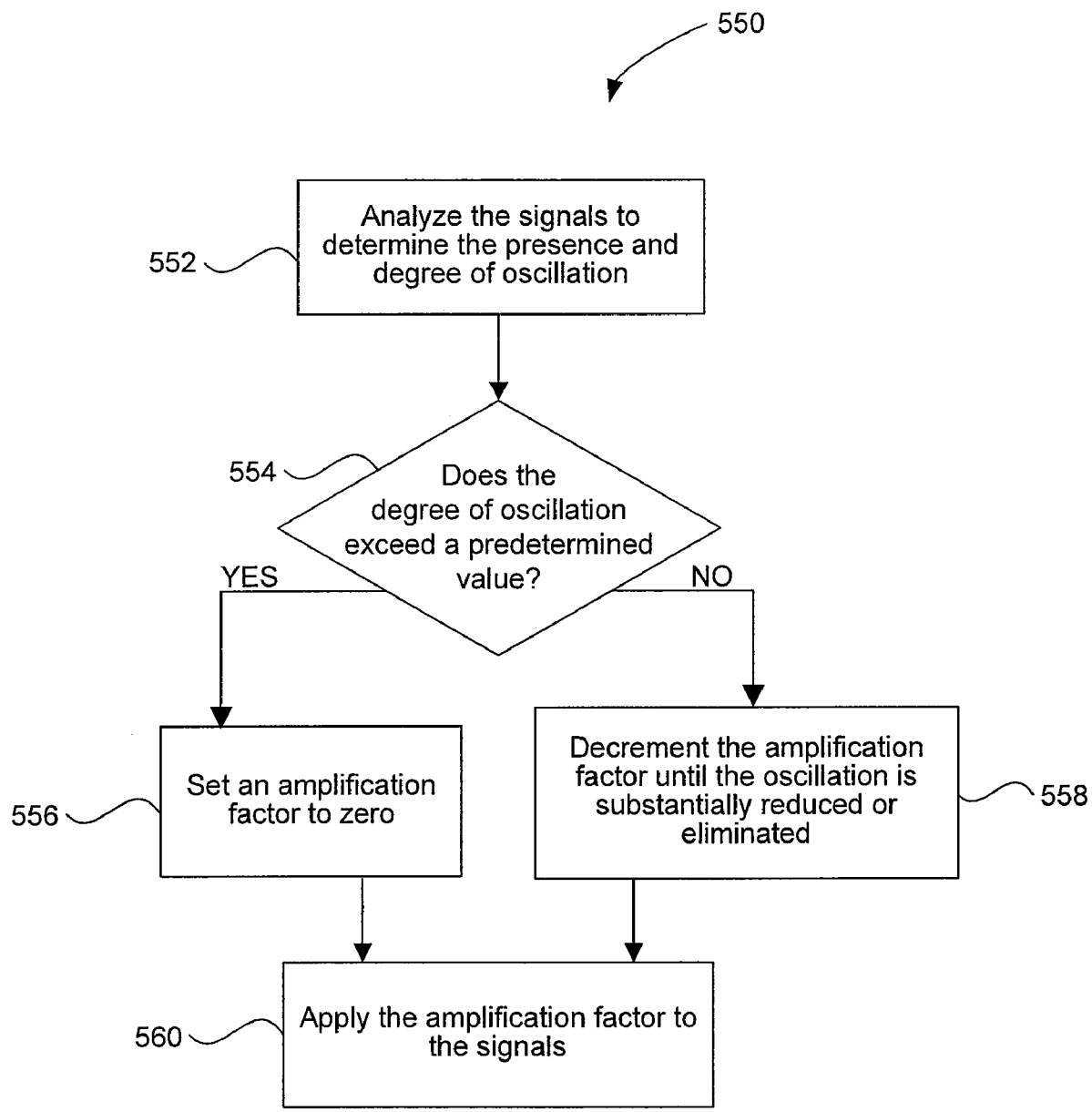

FIGS. 5A and 5B illustrate flow diagrams for exemplary embodiments of the present invention. The following description of FIGS. 5A and 5B may occasionally refer to FIGS. 1-4B. Although reference may be made to a specific element from these figures, such elements are used for illustrative purposes only and are not meant to limit or otherwise narrow the scope of the present invention unless explicitly claimed.

FIG. 5A illustrates a flow diagram for a method 500 of reducing oscillation in a network amplifier. Method 500 includes receiving 502 a downlink signal at the network amplifier from a base station via a first antenna, and receiving 504 an uplink signal from a handset via a second antenna. As shown in FIGS. 4A and 4B, the downlink signal may be received from antenna 410 or 460, and the uplink signal may be received from antenna 412 or 462.

The downlink and/or uplink signals are analyzed 506 to determine the presence of an oscillation created by the network amplifier. If an oscillation is detected, the amplification factor is adjusted 508 in a manner that substantially reduces the presence of the oscillation. In the embodiments of FIGS. 4A and 4B, control circuitry 414 or 464 performs the analysis of the cellular signals and the adjustment of the amplification factor. Oscillation is considered to be substantially reduced when the presence of oscillation is reduced to a level that does not introduce interference into the surrounding cellular network.

In one embodiment, the step of analyzing 506 the cellular signals includes measuring a signal level of the downlink and/or uplink signals. The measured signal levels are compared to predetermined values. The predetermined values may be selected based on a value that, if exceeded by the downlink and/or uplink cellular signals, is likely to be indicative of an oscillating condition within the cellular network amplifier.

In one embodiment, where the predetermined value is exceeded, the amplification factor is reduced by an amount necessary to substantially reduce the oscillation. For example, the amplification factor may be incrementally reduced until the downlink and/or uplink signals fall below the predetermined value. Alternatively, the amplification factor may be automatically reduced to a zero value in the event that the signal level of the downlink and/or uplink signals exceeds the predetermined value. On the other hand, if the predetermined value is not exceeded, the amplification factor may be established so as to produce first and second amplified cellular signals that are strong enough to be successfully transmitted to the cellular telephone and the base station, without increasing noise at either the base station or the handset beyond a tolerable limit. In other words, the amplification factor may be increased to a value that allows signals to be transmitted between the handset and the base station without poor reception or dropped calls.

Method 500 further includes applying 510 the adjusted amplification factor to the uplink and downlink signals. As illustrated in FIGS. 4A and 4B, the adjusted amplification factor is applied to the signals using variable gain modules 404 and 416, or 454 and 466. As described above, the amplification factor may actually include a first and second amplification factor, where the first amplification factor is applied to the downlink signal (e.g., using variable gain module 416 or 466), and the second amplification factor is applied to the second cellular signal (e.g., using variable gain module 404 or 454).

Method 500 also includes transmitting 512 the first amplified cellular signal to the base station via the first antenna, and the second amplified cellular signal to the at least one handset via the second antenna.

FIG. 5B illustrates a flow diagram for a method 550 performed by a control circuit for use in a cellular network amplifier. The cellular network amplifier includes first and second antennas and at least one variable gain module. As described herein, the cellular network amplifier is configured for the amplification and transmission of cellular signals between a handset and a base station. The method 550 includes analyzing 552 the cellular signals to determine the presence and degree of oscillation within the cellular network amplifier. Based on this analysis, the control circuit makes the determination 554 of whether an oscillation is detected at a degree that exceeds a predetermined value.

The predetermined value may be selected to represent a degree of oscillation that if exceeded, produces a severe level of interference into a surrounding cellular network. If it is determined that the degree of oscillation exceeds the predetermined value (i.e., the degree of oscillation is likely to generate severe interference), the amplification factor is immediately set 556 to a zero value. If, on the other hand, it is determined that the degree of oscillation is detected at a degree that does not exceed the predetermined value (i.e., the degree of oscillation is either negligible or relatively minor, thus causing no interference or relatively mild interference), the amplification factor is repeatedly decremented 558 until the oscillation is substantially reduced.

Finally the control circuit instructs 560 at least one variable gain module to apply the resultant amplification factor to the cellular signals. For example, in FIGS. 4A and 4B, the control circuit 414 or 464 may instruct variable gain modules 404 and 416 or 454 and 466 as to what amplification factor to apply to the cellular signals.

In one embodiment, if it is determined that the cellular network amplifier does not have any significant degree of oscillation, method 550 may further include establishing the amplification factor so that the retransmission of the cellular signals has sufficient power to be transmitted to the base station and/or handset.

Figure 6A:
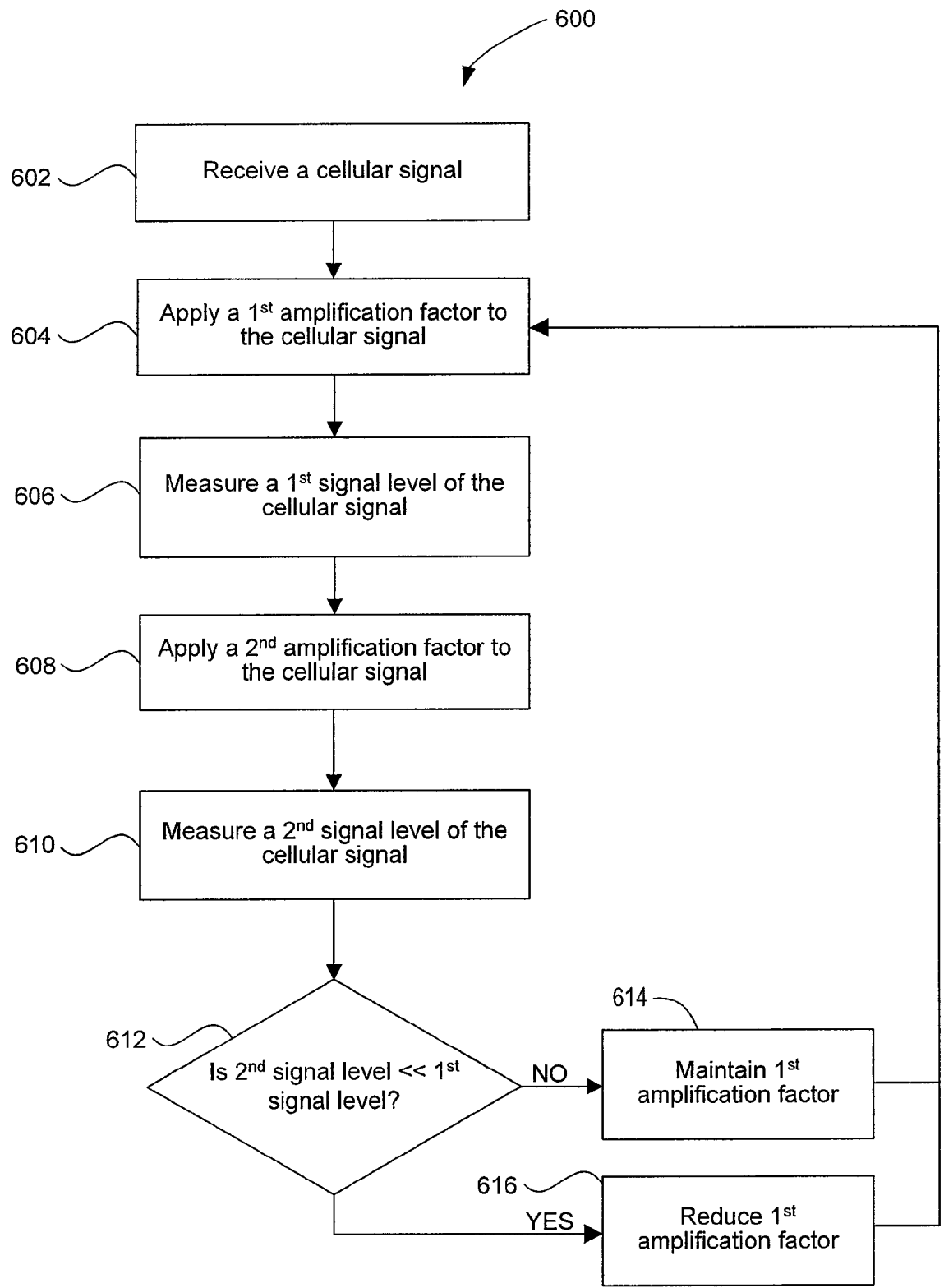

FIG. 6A illustrates one embodiment of a method 600 for detecting and substantially reducing oscillation in a network amplifier. A cellular signal is received 602 by a first antenna. The cellular signal is amplified 604 by an amount determined by a first amplification factor. The resultant amplified cellular signal is transmitted via a second antenna to a target destination, such as a handset or base station.

After the cellular signal is received 602 by the first antenna and while the first amplification factor is being applied to the cellular signal, the level of the cellular signal is measured 606, thereby acquiring a first signal level. The first signal level is recorded, and then a second amplification factor, which is less than the first amplification factor, is applied 608 to the cellular signal. In one embodiment, the second amplification factor is approximately a zero value (i.e., the power amplifier amplifying the cellular signal may be turned off).

While the second amplification factor is being applied to the cellular signal, the level of the cellular signal is measured again 610, thereby acquiring a second signal level. The second signal level is compared 612 to the first signal level. If the second signal level is significantly less than the first signal level, then it is determined that the use of the first amplification factor is likely causing an oscillating condition to occur. Therefore, the first amplification factor is reduced 616 by a predetermined amount, and the process may be repeated until the first amplification factor is reduced by a sufficient amount to eliminate the oscillating condition. However, if the second signal level is not significantly less than the first signal level, it is likely that an oscillating condition does not exist while first amplification factor is applied to the cellular signal. Therefore, the first amplification factor remains unchanged 614, and the process may be repeated.

Figure 6B:
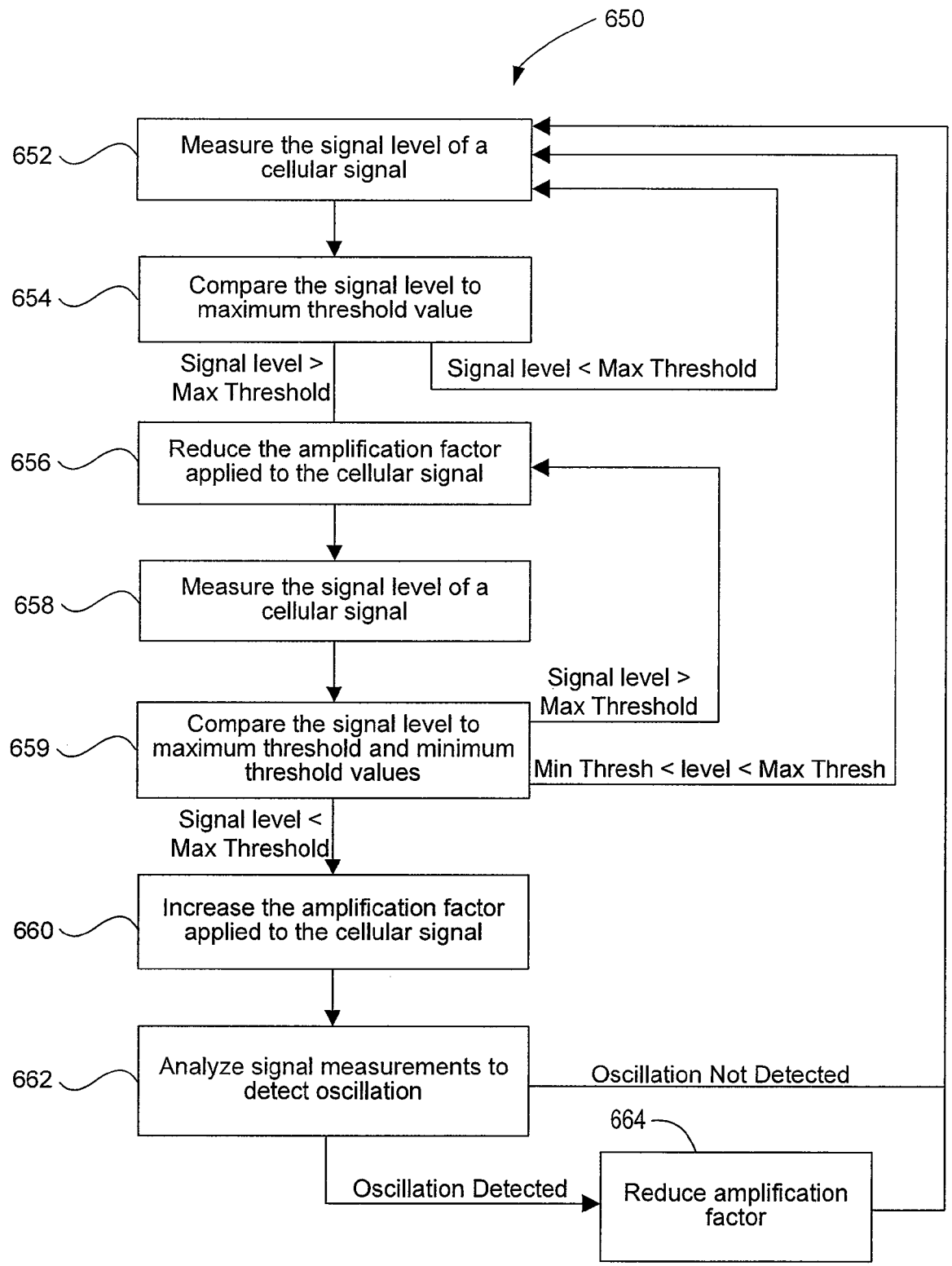

FIG. 6B illustrates another method 650 for detecting and substantially reducing an oscillating condition within a network amplifier. In general, the method 650 includes the process of measuring 652 and 658 a cellular signal level and comparing 654 and 659 the signal level to one or more threshold values. The amplification factor applied to the cellular signal is adjusted 656 and 660 based on the results of the comparisons. The results of multiple comparisons are analyzed 662 in order to detect a pattern that indicates that the presence of an oscillation is likely, and the amplification factor applied to the cellular signal is adjusted 664 in order to eliminate the oscillating condition.

In particular, and in one exemplary embodiment, after a cellular signal is received via an antenna and an amplification factor is applied to the cellular signal, the level of the cellular signal is measured 652 in order to determine 654 whether the cellular signal exceeds a predefined maximum threshold value. If the signal level of the cellular signal does not exceed the maximum threshold value, the method 650 continues measuring 652 the cellular signal and comparing 654 the signal to the maximum threshold value.

In the event that the signal level of the cellular signal exceeds the maximum threshold value, the method 650 reduces 656 the amplification factor applied to the cellular signal. Following the reduction of the amplification factor, the methods of 650 remeasures 658 the signal level of the cellular signal. The method 650 then compares 659 the new signal level to the maximum threshold value and to a predetermined minimum threshold value. If the signal level still exceeds the maximum threshold value, the method 650 will continue to reduce 656 amplification factor applied to the cellular signal until the signal level no longer exceeds the maximum threshold value. If the signal level measured at 658 falls between the maximum threshold value and the minimum threshold value, the method repeats itself, starting with the measurement at 652. However, if the signal level measured at 658 falls below the minimum threshold value, the amplification factor applied to the cellular signal is increased by a predetermined amount.

Finally, the results of the comparisons and/or the adjustments made to the amplification factor are analyzed 662 in order to determine if an oscillating condition likely exists. In one embodiment, the measured signal levels are analyzed in order to detect a pattern that may indicate the presence of an oscillation.

For example, in one exemplary embodiment, the measured signal levels are analyzed in order to detect an alternating pattern, where the measurements of the signal levels alternate between exceeding the maximum threshold level and falling below the minimum threshold level. Therefore, an oscillation is identified if the signal level recorded during a first measurement exceeds the maximum threshold level, the signal level recorded during a second measurement falls below the minimum threshold level, and the signal level recorded during a third measurement exceeds the maximum threshold level. Likewise, an oscillation is also identified if the signal level recorded during a first measurement falls below the minimum threshold level, the signal level recorded during a second measurement exceeds the maximum threshold level, and the signal level recorded during a third measurement falls below the minimum threshold level.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network amplifier, a method for substantially reducing oscillation, the method comprising:
   receiving a cellular signal at a first antenna of a network amplifier;
   applying a first amplification factor to the cellular signal;
   transmitting a resultant amplified cellular signal via a second antenna;
   measuring a first signal level of the cellular signal while the first amplification factor is being applied to the cellular signal;
   applying a second amplification factor to the cellular signal, the second amplification factor being less than the first amplification factor;
   measuring a second signal level of the cellular signal while the second amplification factor is being applied to the cellular signal; and
   reducing the first amplification factor by a predetermined amount in the event that the second signal level is significantly less than the first signal level.

2. The method as recited in claim 1, the method further comprising repeating the method until the second signal level is not significantly less than the first signal level.

3. The method as recited in claim 1, the method further comprising identifying the presence of an oscillation in the event that the second signal level is significantly less than the first signal level.

4. The method as recited in claim 1, wherein the second amplification factor is approximately a zero value.

5. In a network amplifier, a method for substantially reducing oscillation, the method comprising:
   receiving a cellular signal via an antenna of a network amplifier;
   applying an amplification factor to the cellular signal;
   transmitting the resultant amplified cellular signal;
   measuring a signal level of the cellular signal at predetermined time intervals and recording one or more signal levels;
   comparing the one or more signal levels to one or more threshold values;
   adjusting the amplification factor based on the comparison of the signal levels to the one or more threshold values;
   analyzing the results of the comparisons and the adjustments to detect a pattern that indicates the presence of an oscillation; and
   reducing the amplification factor by a predetermined amount in the event that the oscillation is detected.

6. The method as recited in claim 5, wherein adjusting the amplification factor based on the comparison of the signal level to the one or more threshold values further comprises:
   reducing the amplification factor in the event that the signal level exceeds a maximum threshold level; and
   increasing the amplification factor in the event that the signal level falls below a minimum threshold level.

7. The method as recited in claim 6, wherein reducing the amplification factor in the event that the signal level exceeds a maximum threshold level further comprises reducing the amplification factor by a predefined step amount, and wherein increasing the amplification factor in the event that the signal level falls below a minimum threshold level further comprises increasing the amplification factor by the predefined step amount.

8. The method as recited in claim 5, wherein analyzing the measured signal levels to detect a pattern that indicates the presence of an oscillation further comprises detecting a pattern where the recorded signal levels alternate between exceeding the maximum threshold level and falling below the minimum threshold level.

9. The method as recited in claim 8 wherein the pattern includes a first recorded signal level that falls below the minimum threshold level, followed by a second recorded signal level that exceeds the maximum threshold level, followed by a third recorded signal level that falls below the minimum threshold level.

10. The method as recited in claim 8 wherein the pattern includes a first recorded signal level that exceeds the maximum threshold level, followed by a second recorded signal level that falls below the minimum threshold level, followed by a third recorded signal level that exceeds the maximum threshold level.

* * * * *

UNITED STATES PATENT AND TRADEMARK OFFICE
CERTIFICATE OF CORRECTION

PATENT NO.        : 7,409,186 B2
APPLICATION NO.   : 11/457406
DATED             : August 5, 2008
INVENTOR(S)       : V. Alan Van Buren et al.

It is certified that error appears in the above-identified patent and that said Letters Patent is hereby corrected as shown below:

Title Page item (75)
Inventors: Add James W. Wilson, St. George, UT (US) as 4th inventor.

In the Drawings Figure 6B
Between element 659 and 660, change "Signal level < Max Threshold" to -- Signal level < Min Threshold --

Column 1
Line 30, change "result" to -- results --
Line 42, change "through use" to -- through the use --

Column 2
Line 55, change "when oscillation" to -- when an oscillation --

Column 3
Line 53, change "itself Too" to -- itself. Too --

Column 4
Line 42, change " "Cell site" and" to -- The phrases "cell site" and --
Line 53, change " "downlink" signal" to -- "downlink signal" --

Column 7
Line 11, change "exceed" to -- exceeded --
Line 15, change "3 10" to -- 310 --

UNITED STATES PATENT AND TRADEMARK OFFICE
CERTIFICATE OF CORRECTION

PATENT NO. : 7,409,186 B2
APPLICATION NO. : 11/457406
DATED : August 5, 2008
INVENTOR(S) : V. Alan Van Buren et al.

It is certified that error appears in the above-identified patent and that said Letters Patent is hereby corrected as shown below:

Column 8
Line 28, change "372 and 370" to -- 370 and 372 --

Column 10
Line 66, change "sufficient power sufficient" to -- sufficient power --

Column 14
Line 4, change "reduced." to -- reduced or eliminated. --

Column 15
Line 20, change "amount." to -- amount 660 --

Signed and Sealed this

Sixteenth Day of December, 2008

JON W. DUDAS
*Director of the United States Patent and Trademark Office*